United States Patent [19]
Cleereman et al.

[11] 4,122,138
[45] Oct. 24, 1978

[54] METHOD OF PREPARING BLOWN THERMOPLASTIC ARTICLES HAVING MULTIAXIAL ORIENTATION

[75] Inventors: Kenneth J. Cleereman, Midland; Walter J. Schrenk, Bay City; Grant W. Cheney, Midland, all of Mich.

[73] Assignee: The Dow Chemical Company, Midland, Mich.

[21] Appl. No.: 538,850

[22] Filed: Jan. 6, 1975

Related U.S. Application Data

[60] Continuation of Ser. No. 330,999, Feb. 9, 1973, abandoned, which is a continuation of Ser. No. 124,552, Mar. 15, 1971, abandoned, which is a continuation of Ser. No. 740,008, Apr. 4, 1968, abandoned, which is a division of Ser. No. 381,086, Jul. 8, 1964, abandoned.

[51] Int. Cl.² ............................................. B29C 17/07
[52] U.S. Cl. ...................................... 264/25; 264/97; 264/312; 425/526; 425/533

[58] Field of Search .................. 264/89, 90, 92, 94, 264/96, 99, 294, 296, 25, 312; 425/242 B, 324 B, 387 B, 326 B, DIG. 208, DIG. 209, DIG. 214, DIG. 203

[56] References Cited

U.S. PATENT DOCUMENTS

| | | | |
|---|---|---|---|
| 2,792,593 | 5/1957 | Hardgrove, Jr. | 425/384 |
| 2,990,580 | 7/1961 | Foster | 264/346 X |
| 3,288,898 | 11/1966 | West | 264/98 |
| 3,307,726 | 3/1967 | Cleereman | 264/328 X |

OTHER PUBLICATIONS

Modern Plastics Encyclopedia for 1959, 9–1958, p. 794.
Modern Plastics Encyclopedia for 1963, 9–1962, pp. 569–570.

*Primary Examiner*—Jan H. Silbaugh
*Attorney, Agent, or Firm*—B. M. Halldorson

[57] ABSTRACT

A method for manufacturing blown articles is disclosed wherein the article is manufactured from a parison having a high degree of multi-axial orientation. The method permits molecular orientation within the parison to be superposed with orientation imparted during the blowing step, whereby a blown article of greatly improved properties is manufactured.

6 Claims, 11 Drawing Figures

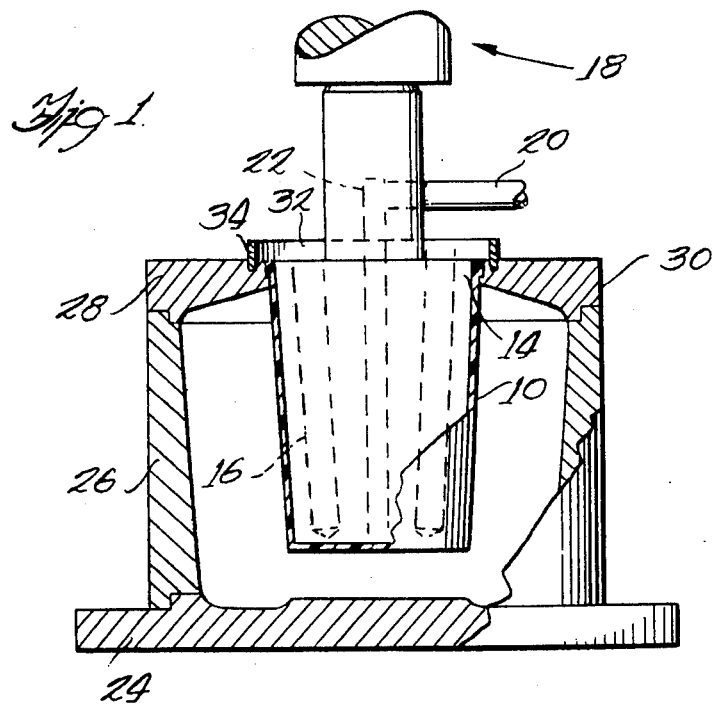
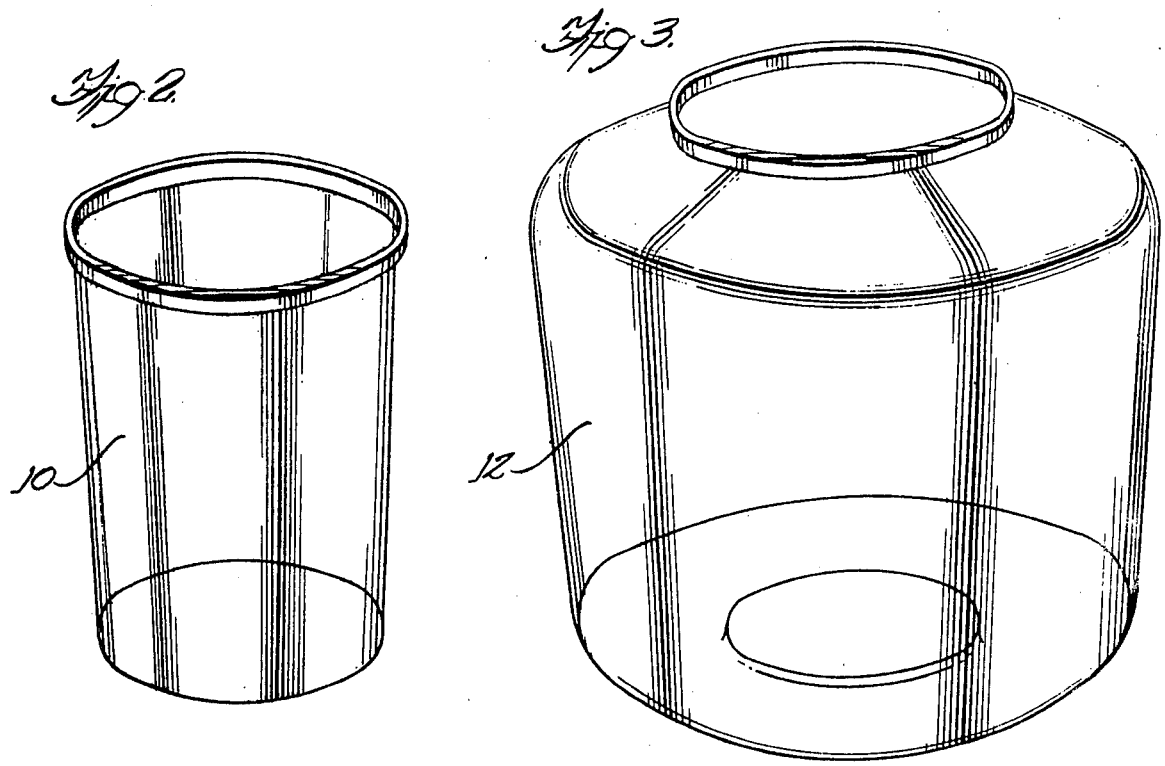

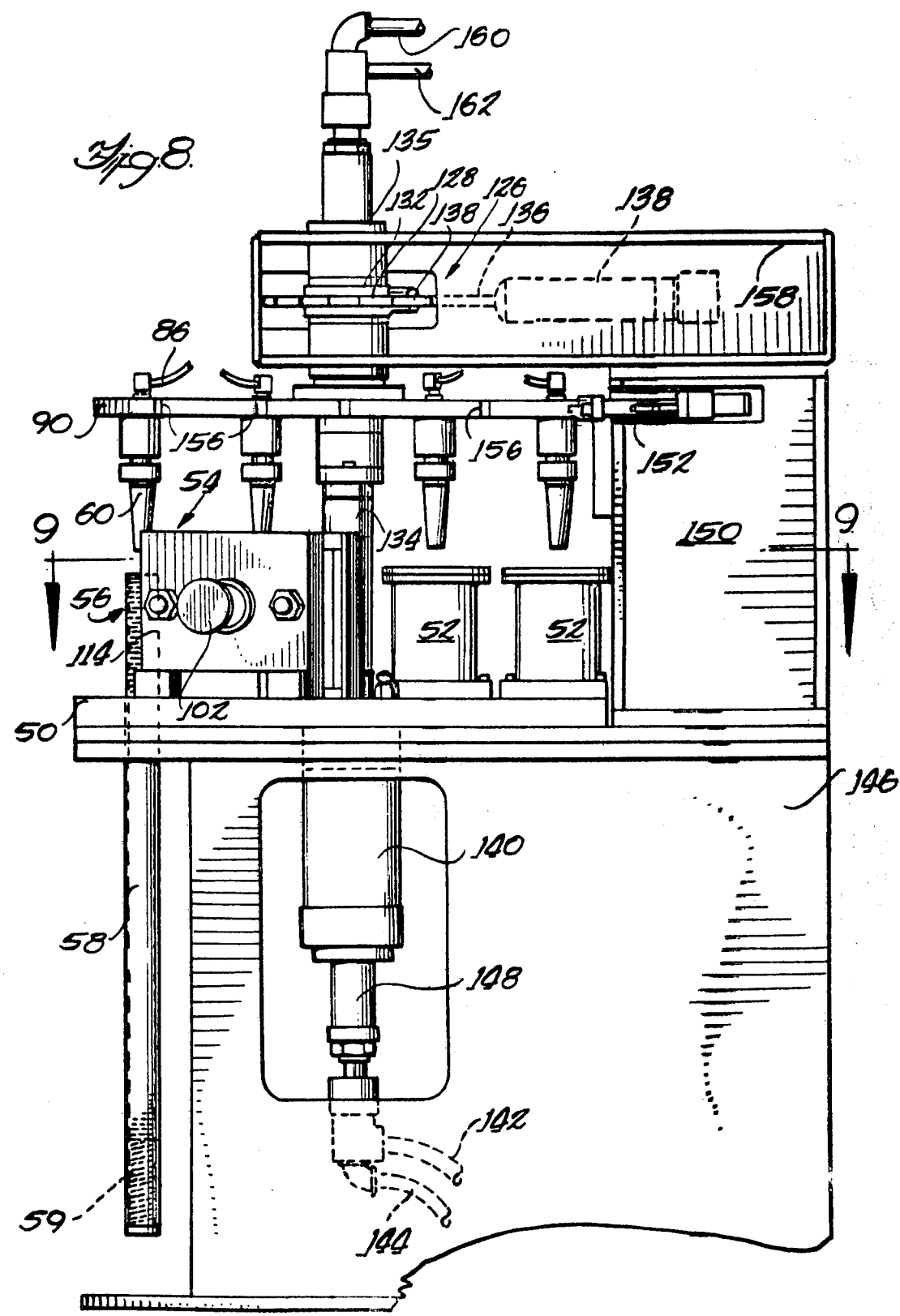

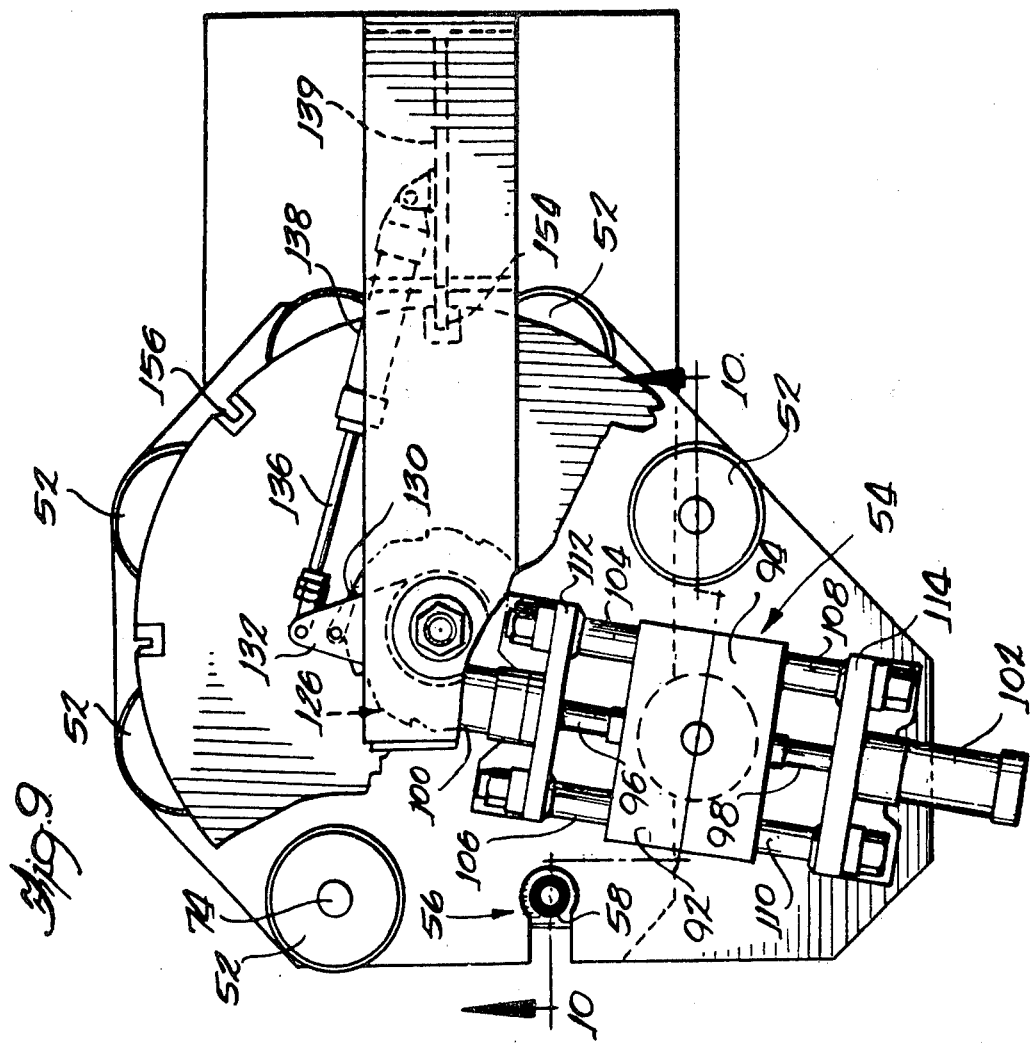
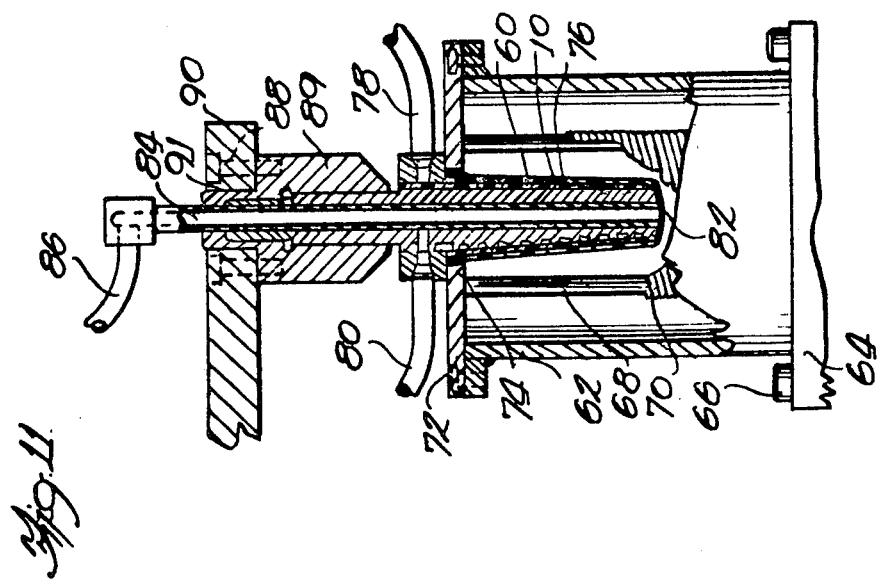

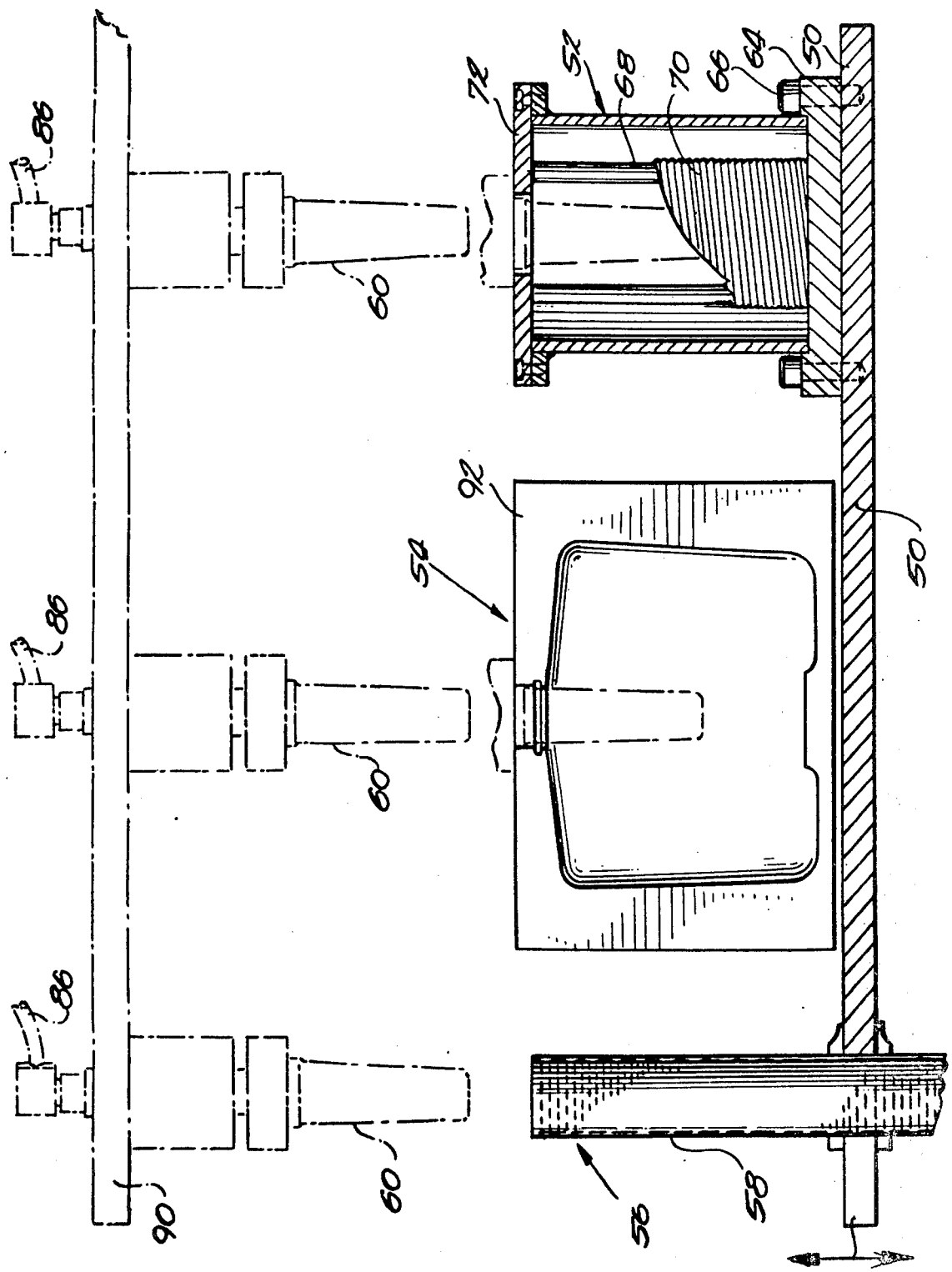

METHOD OF PREPARING BLOWN THERMOPLASTIC ARTICLES HAVING MULTIAXIAL ORIENTATION

CROSS REFERENCE TO RELATED APPLICATIONS

This is a continuation of application Ser. No. 330,999, filed Feb. 9, 1973, which is a continuation of application Ser. No. 124,552 filed Mar. 15, 1971, which is a continuation of application Ser. No. 740,008 filed Apr. 4, 1968, which was a division of application Ser. No. 381,086 filed July 8, 1964. The parent applications are now abandoned.

This invention relates to blow molding and more particularly to a novel method for blow molding unique plastic products.

Blown plastic bottles, dolls, and other blow molded objects have become very popular, especially with the introduction of the more resilient plastics such as polyethylene and polypropylene.

Recently, the more rigid plastics such as polyvinyl chloride and polystyrene have been used for blown containers where the desired physical property, the economics or the esthetics could not be met by using polyethylene or polypropylene. Even the relatively expensive acetal polymers and polycarbonates are being used for blown plastic objects. Unfortunately, in such substitution and use, there is always something to be desired.

For example, it is extremely desirable to use a very low cost plastic such as general purpose polystyrene. Notwithstanding its low cost, it has desirable high modulus and is crystal clear. However, when fabricated without biaxial orientation, it is brittle and tends to crack in the direction of flow of injection or extrusion. It also has unacceptable or borderline environmental stress craze resistance which becomes more pronounced with age and with subjection to certain packaged products. Therefore, its application in packaging, where blow molding is particularly useful, is seriously limited.

An object of this invention is to provide for the blow molding of plastics which require a high degree of orientation to obtain toughness in the finished blown article.

Another object is to provide a method wherein orientation imparted to the parison is retained in the finished blown article.

Another object is to provide a blow molding process which permits separate manufacture of the parison and subsequent blowing of the parison while retaining substantially all of the desirable physical characteristics imparted to the parison.

A further object is to provide a method wherein the orientation previously imparted is substantially retained during reheating and subsequent blow molding.

Another object is to provide a method for making blown plastic articles which resist stress cracking, puncturing, and breakage even during severe use.

Another object is to provide a blow molding process which is relatively economical.

Another object is to provide a blow molding process wherein the more economical plastics, such as general purpose polystyrene can be used.

Another object is to provide a blow molding process for manufacturing blown plastic articles of high clarity.

Other objects of the invention will in part be obvious and will in part appear hereinafter.

The invention accordingly comprises the several steps and the relation of one or more of such steps with respect to each of the others, the apparatus embodying features of construction, combination and arrangement of parts which are adapted to effect such steps, and the product which possesses the characteristics, properties and relation of elements, all as exemplified in the detailed disclosure hereinafter set forth, and the scope of the invention will be indicated in the claims.

It has now been found that highly oriented blow molded articles can be manufactured even if the stress crack prone plastics, such as polyvinyl chloride, polystyrene and the like are used. Such manufacture is possible by imparting a high degree of multiaxial orientation to the parison or parison preform (10 of FIG. 1) during its formation and then immediately using the parison while still hot, or more desirably after it has been reheated under special conditions, in a blowing step to form the finished blown item, such as bottle 12 of FIG. 3. The special technique of reheating that is used does not, surprisingly, cause any substantial loss, if any, of the multiaxial orientation previously imparted to the plastic molecules of the parison. Testing and actual use of the finished blown article reveals that, even under drastic conditions, it has unique strength in all directions. It actually resists cracking in the customary axial pattern of prior art blown articles (see FIG. 4). Instead, it exhibits high modulus and has excellent stress rack resistance (see FIG. 5).

More specifically, it has been found that if one uses a parison which has had a high degree of multiaxial orientation imparted to its molecules during its manufacture, either while still hot, or preferably, after it has been reheated under certain conditions, one can actually blow articles of high multiaxial orientation. Reheating is preferred because it permits separating the parison mold operation from the blow mold operation which introduces economies never heretofore believed possible. The reheating process involves raising the temperature of the parison rather rapidly and preferably from both the inside and the outside to a temperature high enough to blow it into a finished article. The upper limit of temperature should, however, be low enough to avoid relaxation of the multiaxial strength originally existing in the parison. If desired, shielding of portions of the parison to enable the blowing of odd shapes, may also be undertaken without loss of the orientation originally imparted. Shielding can also be used to soften thicker corner or wall sections of the parison to effect better blowing and to control the wall thickness of the finished articles.

Apparatus has also been devised which uniquely accomplishes the above method on a pilot or a production scale as desired.

The pilot apparatus (FIG. 1), in its broadest aspects, comprises a mandrel upon which the parison fits snugly. The mandrel contains parison heating means with control whereby the parison walls and base are heated, rather rapidly, but without relaxation of the orientation of the molecules therein. A blow mold is positioned around the parison. After the parison is relatively soft, it is blown via a blow pipe within the mandrel. The mold is then disassembled and the blown object removed.

The production apparatus, in its broadest aspects, comprises parison feeding, heating and blowing means with a conveying mechanism between each station.

More particularly, the apparatus has a parison feeding station where individual parisons are picked up by a mandrel affixed to a turntable. The mandrel then inserts the parison into a uniquely constructed oven where it and the oven supply heat to both walls of the parison in a rather rapid manner to soften it. The oven is designed to apply penetrating radiant heat to the outside of the parison, and the mandrel supplies heat to the inside of the parison. Such two wall heating of the parison enables faster and more uniform heating and softening of the parison without loss of orientation. Indeed, it is even more efficient than the pilot apparatus described above.

After heating, the softened but still multiaxial oriented parison is positioned between a sectional blow mold and then blown. It is subsequently removed. Valving is located on the apparatus to effect programming on a continuous production basis.

For a fuller understanding of the nature and objects of the invention, reference should be had to the following detailed description taken in connection with the accompanying drawings in which:

FIG. 1 is a cross-sectional side view of a relatively simple embodiment of apparatus useful for carrying out this invention.

FIG. 2 illustrates a parison utilized to make the novel blow molded objects of this invention.

FIG. 3 illustrates a blown jar or bottle formed in accordance with the technique of this invention.

FIG. 8 is a side view of a more detailed embodiment of apparatus useful for carrying out this invention on a mass production scale.

FIG. 9 is a top view partly in section of the apparatus of FIG. 8.

FIg. 10 is a side cross-sectional view of the apparatus of FIG. 8 taken along line 10—10 of FIG. 9.

FIG. 11 is a detailed side view, mostly in section, of the mandrel and oven for heating the parison.

Similar reference characters refer to similar parts throughout the several views of the drawings.

Figure 4:
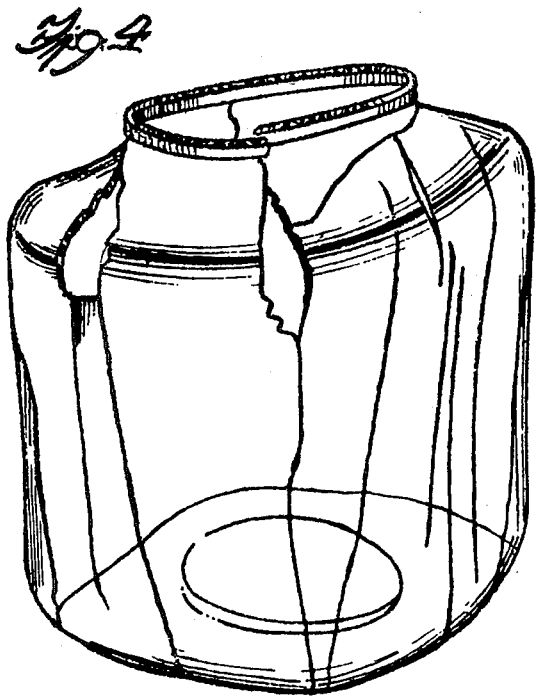
FIG. 4 illustrates a similar blown jar which was formed utilizing prior art techniques and showing the stress cracking that normally occurred when it was subjected to testing or to drastic use conditions.

For the process of this invention, a parison 10 (FIG. 2) having multiaxial orientation is used. It can be made by an injection molding technique which imparts multiaxial orientation to the molecules therein. Such orientation is accomplished by rotating one of the die elements past the fill point of the mold cavity to impart a strain upon said molecules as the plastic solidifies thereby orienting them. The parison can also be made by impact molding. Orientation is imparted to the molecules in the parison by rotating one element of the mold during the impact movement thereof, and for a short time thereafter as the plastic solidifies.

When the relatively simple manual apparatus of FIG. 1 is used, the parison, either while still hot from the injection of impact molding operation, or after cooling and/or storage, is manually placed onto heated mandrel 14 which is preferably made of aluminum, but may also be made of other metals such as copper, brass and bronze.

The parison fits snugly on the mandrel so as to enable efficient conduction of heat from the mandrel into the parison wall. The snug fit also supports the parison against shrinkage and relaxation of its orientation.

The mandrel is heated by several cartridge heaters 16 which dip into a well within the mandrel body. The support of the inner surface of the parison, by its intimate fit against the mandrel, restrains the parison from shrinkage in either the hoop or axial directions. Simultaneously, the mandrel heats the parison to blowing temperatures. The rate and the upper level of temperature is controlled by a thermocouple located near the surface of the mandrel (not shown). The exact temperature to which the mandrel is heated depends upon the parison design and the properties of the material of the parison, i.e., softening point, relaxation point, melt viscosity, etc.

An air piston 18 raises and lowers the mandrel in accordance with the particular step then involved.

Air for blowing the piston 10 after it has been sufficiently softened is supplied through air pipe 20 and passageway 22 within the piston 18.

The blow mold, as shown in FIG. 1, comprises four elements, but it should be evident that the number of elements is unimportant. As shown, it comprises a base platen 24, a cylindrical mold wall, and two semi-circular ring tops (mold tops) 28 and 30. The top ring 32 of the mandrel 14 has a downward extending locking ring 34 which acts to retain the two mold tops 28 and 30 together when the mold is closed. Mold wall 26 is bolted to the base platen 24.

The blow method involves heating the parison rather rapidly while it is supported on the mandrel and then after the parison is sufficiently hot and soft, air, under pressure, is forced into passageway 22 to blow the parison outwardly into a bottle or jar 12 (FIG. 3)

Specific operating conditions for blowing general purpose polystyrene parisons with multiaxial orientation into bottles involve the following typical data for the apparatus shown in FIG. 1:

TABLE 1

| | |
|---|---|
| Mandrel Temperature | 255° F |
| Heating Time | 60 sec. for .045" wall |
| | 40 sec. for .035" wall |
| Blowing Air Pressure | 80 psi |
| Mold Temperature | Approx. 80° F |
| Cooling Time in Mold | Less than 3 secs. |

It should be realized that the process conditions set forth above involve only mandrel heating of the parison. If the more advantageous two-wall heating described below is utilized, different process conditions, such as indicated in Table 3 hereinafter, will obviously be required, for the heating of the parison wall will be much more rapid. Such more rapid heating effects even better control over relaxation of the multiaxial orientation imparted to the molecules of the parison.

With the process conditions of Table 1, and the apparatus of FIG. 1, bottles or jars 12 of the type shown in FIG. 3 with dimensions of 5 inches in diameter and 4½ inches tall can be easily made using parisons of approximately 2½ inches in diameter and 3¾ inches tall. If desired, the side wall thickness may be varied by using parisons having different wall thicknesses. For example, if a parison of 0.045 inch thick wall is used, the blown bottle has a side wall thickness of 0.013 inches average. If 0.035 inch parisons are used, the side wall thickness will be reduced to 0.010 inches average.

The injection molding conditions of the parisons of general purpose polystyrene used in the above apparatus can be as indicated in Table 2:

TABLE 2

| Torque of the Rotating Mold Core in lbs. | No. of Revolutions of Mold Core | Plastic Temp. During Injection ° F |
|---|---|---|
| .035 Thickness | | |
| 0 | 0 | 460 |
| 364 | .1 | 455 |
| 730 | .34 | 450 |
| 1090 | .87 | 445 |
| 1460 | 1.06 | 445 |
| 1820 | 1.75 | 440 |
| 2180 | 2.28 | 440 |
| 2550 | 3.03 | 440 |
| 2920 | 3.47 | 440 |
| .045 Thickness | | |
| 0 | 0 | 445 |
| 730 | .96 | 435 |
| 1090 | 1.80 | 430 |
| 1460 | 1.90 | 430 |
| 1820 | 2.72 | 430 |
| 2190 | 3.20 | 430 |
| 2560 | 4.37 | 430 |
| 2920 | 8.30 | 430 |
| 3280 | 13.00 | 430 |
| 3640 | 21.00 | 430 |

A number of blown containers made by the technique described above, were tested by several methods to determine the amount and nature of the orientation retained after blowing.

Figure 5:
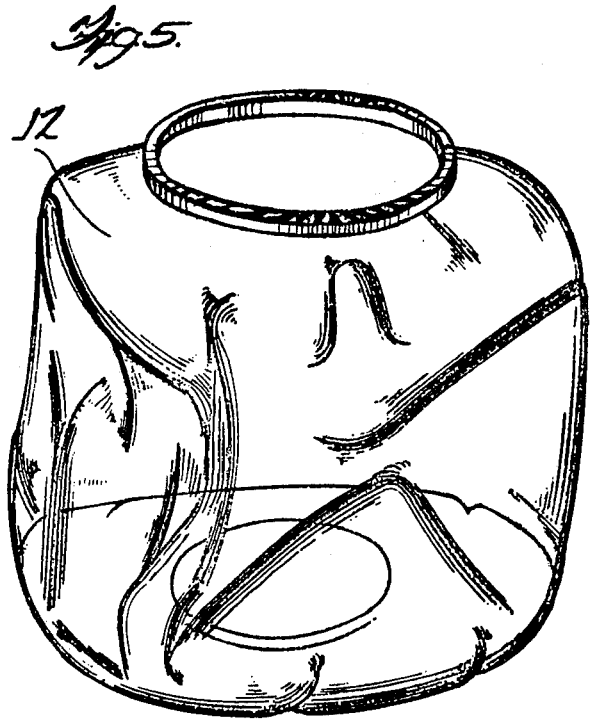
FIG. 5 illustrates the blown jar of this invention after subjection to similar testing or drastic use conditions.

The degree of orientation was determined by a subjective test wherein the examiner crushed, punctured, bent, bounced, and in general destroyed the sample while noting the appearance of any failure. FIG. 5 typifies the result that was obtained. The bottle shown obviously possessed a high degree of multidirectional orientation so that no vertical cracking occurred. In contrast, an unoriented blow molded bottle of similar dimension (as seen in FIG. 4) evidenced severe cracking and breaking, in a vertical direction.

In another test, strips were cut from the side wall of a container blown in accordance with this invention and from the side wall of a container blown in acordance with prior art techniques. Such strips were subjected to heat shrinkage by placing them into an oven at 115° C. All the strips shrunk, but the shrinkage of the strips out from the first container was helicoid, whereas the second container shrank in all directions. Helicoid shrinkage is due to shrinkage of different layers in different directions. Such layered shrinkage demonstrated that the orientation is actually laminar and is typical of the laminar structure of the parison utilized. The latter pattern seems to dominate the pattern in the blown bottle.

Birefringence measurements were also made. The birefringence pattern obtained compared to that of the pattern of the parison. Apparently, the magnitude of orientation in the parison was retained in the blown bottle. It was also found that the shape of the birefringence profile was similar to that of the parison. In fact, the blown bottle had a much higher magnitude of birefringence probably due to the extra orientation incurred by the blowing of the walls of the parison.

Figure 6:
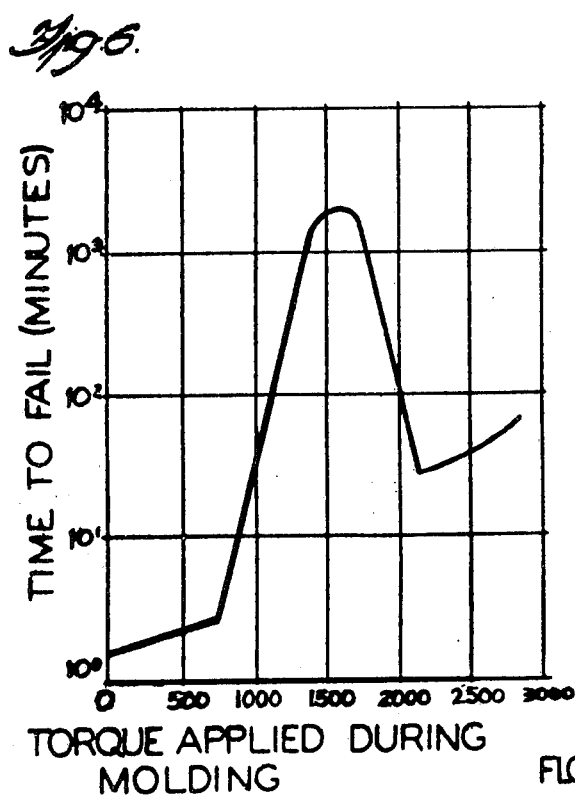
FIG. 6 is a graph illustrating (on semi-log scale) the importance of torque applied during molding and its effect upon failure of the blown article when subjected to vegetable oil testing under pressure.

Environmental stress craze testing was also performed wherein circular specimens were cut from the side wall of many bottles. Four specimens were tested from each bottle and the average time to fail was plotted against the torque that was applied during the injection molding of the parison. Each specimen was stressed with ten pounds per square inch hydrostatic pressure against one side while vegetable oil was touching the other side. Reference is made to FIG. 6 which illustrates the results of such testing.

As seen, at zero torque for the parison, only flow orientation is obtained in the blown bottle and the test specimens failed within one to two minutes; whereas, using a parison with torque applied during its injection molding, improved craze resistance is obtained. The test specimens lasted for several thousand minutes before failing.

Figure 7:
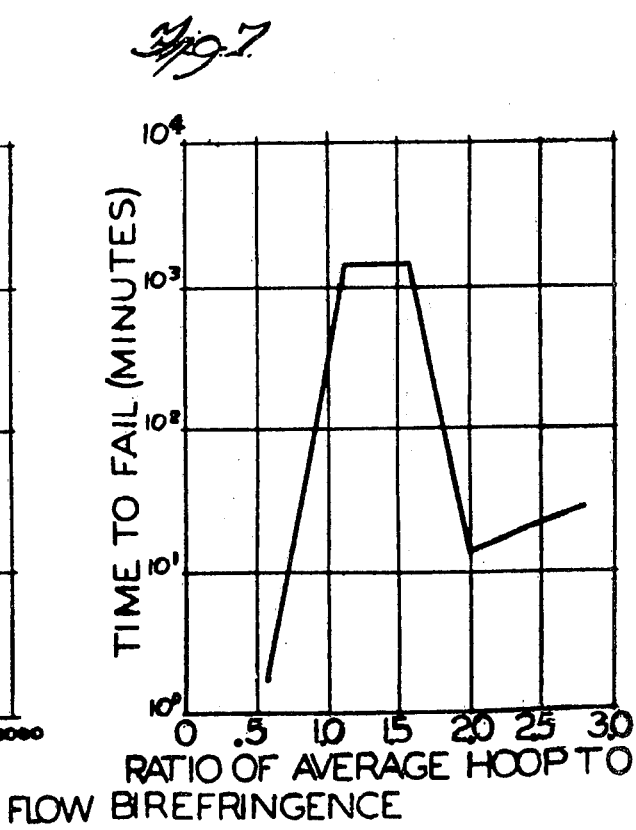
FIG. 7 is a graph illustrating (on semi-log scale) the importance of birefringence in both the hoop and the flow directions (shown as a ratio) to the strength of the blown article.

FIG. 7 is a plot of the time to craze as a function of the ratio of average hoop to flow birefringence. The graph demonstrates that optimum biaxial stress craze resistance is obtained when the orientation is high and reasonably balanced between the flow and hoop directions. Such optimum orientation is obtained when a parison having multi-axial orientation is used and when the blowing does not wipe out or relax the orientation originally imparted to the parison.

Fron the data, it should now be evident to the reader that a stronger blown bottle has been formed which has a several thousandfold improvement in environmental stress craze resistance.

If it is desired to form blow molded objects of high multiaxial strength on a mass production scale, the apparatus of FIGS. 8 to 11 is utilized. It is capable of treating parisons having multiaxial orientation at high speed but substantially with the same technique as by the simplified apparatus of FIG. 1. Again, the parison used is one which has multiaxially oriented molecules and may have been made by injection molding or by impact molding as described above.

The mass production apparatus shown in FIGS. 8 to 11, in its preferred form, comprises a vertically movable table 50 having a plurality of parison heating ovens 52 peripherally situated thereon. The exact number of ovens is unimportant so long as the parison being treated therein is sufficiently heated for blowing when it reaches blow mold station 54. Although six ovens are shown in FIG. 9, it should be understood that a greater or lesser number may be utilized depending upon the needs of the situation.

Table 50 also contains a parison loading station 56. It comprises a vertically disposed parison supply tube 58 open at the top. The tube has a spring 59 therein which biases a stacked array of parisons 10, each having multiaxial orientation upwardly. The parisons are dispensed through the upper open top of tube 58 by the action of a mandrel 60 which enters into the cavity of each parison as table 50 rises. A blow mold station 54 is also located on the table.

Each parison heating oven 52, in its preferred form, comprises a radiant heat source which heats the outside surface of the parison when it is immersed into the oven. The inside surface of the parison is simultaneously heated via the mandrel 60 by the circulation of heat exchange fluid through its body (see FIG. 11). Such outer and inner application of heat provides for more even and quicker temperature rise in the parison wall.

Referring to FIG. 11, each oven comprises a vertically disposed outer tubular oven wall 62 secured to a base plate 64 which is bolted via bolts 66 to table 50. Within the outer wall 62 is a concentrically arranged inner oven tube 68 of steel or ceramic or similar heat resistant material with a resistance wire 70 wound around the outside. On passage of an electrical current through the wire, heat is generated therein and tube 68 gets red hot. Such red hot heat provides the radiant heat source referred to above.

A cover plate 72 with an axial parison receiving orifice 74 therein encloses the top of oven wll 62 and inner oven tube 68. Orifice 74 is dimensioned to receive parisons with a relatively close fit between the upper parison wall and the orifice wall. The cover plate and the base plate 64 are preferably constructed with resistance wire incorporated therein. Such incorporation is conventional and therefore it has not been shown in the drawing.

Along with oven 52, the mandrel 60, upon which the parison is mounted, as best seen in FIG. 11, also supplies heat to the parison. As seen in cross-section, the mandrel 60 contains helically formed heat coil 76 preferably arranged near the surface of the mandrel. The coil is fed by inlet pipe 78 and return pipe 80. Both pipes communicate with a constant temperature oil bath.

It should be evident that this furnace-mandrel heat arrangement provides for even application of heat to the parison wall and facilitates a temperature rise thereof.

The mandrel 60 also has a parison pickup, blow and release orifice 82 for manipulation of and for blowing the parison, and for release of the finished blown object from the mandrel. The orifice is located at the end of a passagewasy 84 axially located within mandrel 60. Flexible hosing 86 connects the passageway 84 to a four-way control valve, (not shown), of standard design, which regulates the application of vacuum to the orifice to pick up a parison from parison supply tube 58 and to retain it there while being passed through the various ovens 52 and to apply air pressure to blow the parison into a blown bottle or other object and then to release the finished object therefrom in accordance with the sequence of operation of the table 50 and the turntable 90. Such a valve is standard in the trade and its operation is within the skill of a technician. Therefore, it has not been described in detail.

Each mandrel 60 is secured to turntable 90 via bolts 88, and a collar 89, which is preferably made of a heat insulating material to prevent conduction and loss of heat from the mandrel to the turntable. Spring 91 biases the mandrel downwardly and permits side play thereof so that exact alignment of each mandrel and each oven orifice 74 is not critical to the operation of the apparatus.

The blow molding station 54, which is affixed to table 50 (see FIGS. 9 and 10), comprises a split type blow mold having two mold sections 92 and 94 (see FIGS. 9 and 10) each of which contains one-half of the blow mold cavity 93. Each section 92 and 94 is affixed to the outer end of a reciprocating piston rod 96 and 98, respectively. Each rod 96 and 98 extends out of a hydraulically operated piston-cylinder assembly 100 and 102 whereby each blow mold section 92 and 94 may be reciprocated on blow mold guide rods 104, 106 and 108 and 110, respectively in accordance with the sequence of operation of the turntable 90. The guide rods span the distance between two right angle supports 112 and 114 which are bolted to the table 50.

The turntable 90 is journalled upon main shaft 134 via collar 135 and is rotated by a ratchet mechanism 126 (see FIS. 8 and 9) which comprise ratchet wheel 128 secured to collar 135 and a pawl 130 is rotatably secured to and inwardly biased on a rotatable pawl support plate 132, which is journalled upon main shaft 134. The plate 132 is moved about shaft 134 by piston rod 136 which extends out of a piston-cylinder assembly 138, the base end of which is secured to vertical support 150. The piston cylinder 138 is powered by a hydraulic system (not shown) which is keyed to be operated, in sequence, with a separate hydraulic system which causes vertical movement of the turntable. Both movements are timed to provide for optimum heating of each parison without loss of orientation prior to blowing said parison when in a sufficiently softened state.

Vertical movement of table 50 is accomplished by a table lift piston-cylinder assembly 140 (see FIG. 8) secured to the underside of the table. The table slides, in vertical fashion, on main shaft 134. Piston rod 136 extends downwardly from the piston-cylinder assembly 140 and is secured to base 146 via support 148 so that the piston-cylinder assembly 140 actually moves with table 50. The assembly is actuated by oil under pressure via table lift feed line 142 and discharge line 144.

Vertical support 150, which extends upwardly from one side of base 146, supports the turntable rotating piston-cylinder assembly 138 and also an indexer 152 for the turntable (see FIG. 8). The latter comprises a hydraulically actuated tongue 154 which enters into indexing slots 156 on the turntable to lock the turntable with mandrels 60 accurately positioned over oven orifices 74, or over the parison supply tube opening or the blow mold station opening. Overtravel or backward drift of the turntable is therefore avoided.

Guard 158 encloses the ratchet wheel 128, pawl 130 and the operating mechanism therefore so that operating personnel will be protected from injury.

It may be recalled that each parison pickup blow and release orifice 82 is connected via passageway 84 and flexible line 86 to a four-way valve, the operation of which is keyed to the operation of table 50 and turntable 90. Each such valve is preferably located on turntable 90 and communicates with a pressure and a vacuum manifold cavity, both within the upper portion of main shaft 134. Air under pressure or vacuum is supplied to said manifold cavity via line 160 and 162, respectively, which extend from the top of main shaft 134. The exact structure of this arrangement is believed to be within the skill of an artisan and therefore is not described in detail here.

Operation of the mechanism just described should be fairly evident from the above description. It involves a step-wise rotary movement of turntable 90 with a related vertical reciprocating movement of table 50, when each parison is exactly positioned over either an oven 52, the blow mold station 54, or the parison supply station 56. Starting from the parison supply station, the mandrel, which is positioned over the station 56 moves into the cavity of the uppermost parison within the supply tube 58 by the vertical upward moement of table 50. The control valve of the mandrel applies a vacuum to the parison pickup orifice 82 therein, and this causes a gripping of the uppermost parison in the supply tube 58. Then table 50 drops and after it is fully droppd, the turntable revolves to position the parison above the first oven 52 adjacent the supply station 58. Table 50 rises and this causes the parison to enter into the oven. The parison is then initially heated by the radiant heat of the oven and by heating fluid which begins to pass through the mandrel. Meanwhile, the next mandrel in line on turntable 90 picks up a second parison. Then table 50 again drops and turntable 90 partially rotates to position the first parison over a second oven 52 while the second parison is positioned over the first oven. Then table 50 again rises to repeat the heating of the two parisons and the pick up of a third parison until the first parison reaches the blow mold station 54. At this time, the parison is sufficiently heated to enable blowing. The blow mold sections 92 and 94 close around the parison. Then the four-way valve of the mandrel switches over to the supply of air to the interior of the parison. This blows the parison outwardly into conformity with the interior walls of the cavity of the closed blow mold sections.

Now, after formation of the blown object, the air pressure within it is vented to the atmosphere and the blow mold sections 92 and 94 open. A spurt of additional air pressure through the parison release orifice 82, after table 50 drops, causes removal of the blown object from the mandrel. A conveyor (not shown) removes the released blown bottle and conveys it to a subsequent operation such as removal and packaging or use in a bottle filling machine. Indeed, if desired, a conveyor may be used to supply freshly molded parisons to the apparatus instead of via the parison supply tube 58 described above. Such use of conveyors would automate the entire operation from parison formation to bottle filling. Thus, a mass scale user of blown plastic bottles, by installing an injection or impact molding machine of the type necessary to form parisons having multiaxial orientation with the apparatus of this invention and desirably with a bottle filling machine, with conveyors therebetween, could fully automate his operation with minimal space requirement for the machine, minimal transportation requirement customarily needed to transport empty bottles and with maximum integration with consequent savings in costs.

It should be evident that the blow mold mechanism described in detail above is capable of fairly rapid operation. Indeed, as shown, it is possible to form a blown multiaxial oriented bottle every six seconds. Even faster rates are possible by the use of multiple indexing and with a greater plurality of blow molds situated on table 50. In fact, table 50 and turntable 90 could be enlarged to accommodate more supply station ovens and blow molds.

Reference is now made to a specific example to illustrate the typical operating conditions for the production apparatus described:

EXAMPLE

The mandrel temperature, oven temperature, and heating time depend on the parison thickness and the plastic formulation.

For general purposes polystyrene, mandrel temperatures between 230° and 280° F, and oven temperatures between 600° and 900° F can be used. For rubber modified polystyrene, mandrel temperatures between 230° and 280° F, and oven temperatures between 550° and 800° F can be used. The heating time for a 0.035 wall thickness tumbler is about 6 to 12 seconds.

Typical data is shown below for two types of polymers. .035 thick tumblers were used as parisons:

TABLE 3

|  | General Purpose Polystyrene | Rubber Modified Polystyrene |
|---|---|---|
| Oven temperature °F | 645 | 580 |
| Mandrel temperature °F | 250 | 230 |
| Heating time sec. | 12 | 8 |
| Air pressure to blow psi | 78 | 78 |

It should be realized that considerable leeway exists in temperatures and time to heat.

Thicker parisons obviously require longer heating time. Higher heat resistant plastics will also require higher mandrel and oven temperatures. Some plastics will require greater air pressures in order to obtain good detail on the blown bottle.

In the eight station blowing machine described above, a heating time of 25 sec. or more, for thick parisons (over 0.060 in.) is usually sufficient. Thinner parisons may be accommodated by simply not using all of the ovens and/or by reducing the oven mandrel temperature.

There are obviously many possibilities for the substitution of equivalent structures in portions of both embodiments of the apparatus described. The same comment applies to the method. For example, with the relatively simple apparatus of FIG. 1, one could use the same mandrel for injection or impact molding the parison and for blowing it immediately after it is formed or after it has cooled and is then reheated. Also, objects other than the bottle or jar shown could be formed. These items could obviously possess irregular shapes in accordance with the shape of the blow mold cavity. Also, in the production apparatus of FIGS. 8 to 11, the six individual ovens 52 shown could be replaced by a singular arc shaped tunnel oven preferably with provision for rotating the parison as it travels through the tunnel oven.

It will thus be seen that the objects set forth above, among those made apparent from the preceding description, are efficiently attained, and since certain changes may be made in carrying out the above process, in the described product, and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A method for preparing a blown thermoplastic article of significantly improved properties comprising the steps of:
   (i) preparing from a molecular orientatable thermoplastic, a hollow parison preform, the molecules of which possess multiaxial orientation, the preform being prepared in an injection mold with a rotatable element and being characterized by exhibiting generally helicoidal shrinkage of strips cut from the side wall of the preform;
   (ii) removing the preform from the injection mold and thereafter applying heat to condition the preform for blow molding, such conditioning step being of sufficiently short duration and under a temperature condition which maintains the preform sufficiently cool to prevent substantial relaxation of the molecular orientation imparted to the preform in the injection molding step (i);
   (iii) simultaneously with said heat conditioning step (ii), restraining said preform from substantial shrinkage in the hoop and axial directions, said restraining step comprising supporting the preform on a mandrel generally intimately contacting the interior of the hollow preform;

(iv) containing the preform in a hollow blow mold, the preform being supported on said mandrel;

(v) and before the multiaxial orientation substantially relaxes out of the preform, expanding the oriented preform to the configuration of the blow mold, the process being characterized by the blown article prepared thereby possessing a significantly higher magnitude of molecular orientation than the molecular orientation possessed by the preform.

2. The method of claim 1 wherein step (i) comprises preparing the preform in an injection mold cavity wherein one of the elements defining the cavity is rotated after the cavity is filled with thermoplastic.

3. The method of claim 2 wherein said heat conditioning step comprises heating the blowing mandrel.

4. The method of claim 2 wherein said heat conditioning step comprises applying heat to said parison preform by radiant heating.

5. The method of claim 2 wherein said heat conditioning step comprises heating the blowing mandrel and simultaneously applying heat to the opposite surface of the parison preform.

6. The method of claim 2 wherein said heat conditioning step comprises reheating a substantially cold parison preform.

* * * * *